United States Patent [19]

Peterson et al.

[11] Patent Number: 5,231,301
[45] Date of Patent: Jul. 27, 1993

[54] SEMICONDUCTOR SENSOR WITH PIEZORESISTORS AND IMPROVED ELECTROSTATIC STRUCTURES

[75] Inventors: Kurt E. Peterson, San Jose; Lee A. Christel, Menlo Park, both of Calif.

[73] Assignee: Lucas NovaSensor, Fremont, Calif.

[21] Appl. No.: 771,301

[22] Filed: Oct. 2, 1991

[51] Int. Cl.[5] ...................... H01L 29/84; H01L 29/96
[52] U.S. Cl. ..................................... 257/419; 257/364; 257/489; 257/537; 73/727
[58] Field of Search ............... 257/254, 364, 412, 415, 257/417, 418, 419, 420, 489, 536, 537, 538; 73/721, 727, 516 R, 517 R, 517 AV

[56] References Cited

U.S. PATENT DOCUMENTS

| | | | |
|---|---|---|---|
| 4,057,822 | 11/1977 | Watanabe | 357/52 |
| 4,270,137 | 5/1981 | Coe | 257/489 |
| 4,480,488 | 11/1984 | Read et al. | 73/862.68 |
| 4,580,156 | 4/1986 | Comizzoli | 257/489 |
| 4,618,397 | 10/1986 | Shimizu et al. | 156/628 |
| 4,622,856 | 11/1986 | Binder et al. | 73/727 |
| 4,737,473 | 4/1988 | Wilner | 437/154 |
| 4,838,088 | 6/1989 | Murakami | 73/724 |

Primary Examiner—Andrew J. James
Assistant Examiner—Sara W. Crane
Attorney, Agent, or Firm—Wilson, Sonsini, Goodrich & Rosati

[57] ABSTRACT

An electromechanical sensor is provided which comprises an n-type semiconductor region which defines a flexible member surrounded by a thicker base portion; at least one piezoresistor formed in the semiconductor region; an n+ region formed in the thicker base portion; a first insulative layer which overlays the piezoresistor and which extends at least from the piezoresistor to the first n+ doped region; a guard layer which overlays at least a portion of the first insulative layer such that the guard layer overlays the piezoresistor and extends at least from the piezoresistor to a point adjacent to the n+ region; and a first bias contact which electrically interconnects the n+ region and the guard layer.

23 Claims, 4 Drawing Sheets

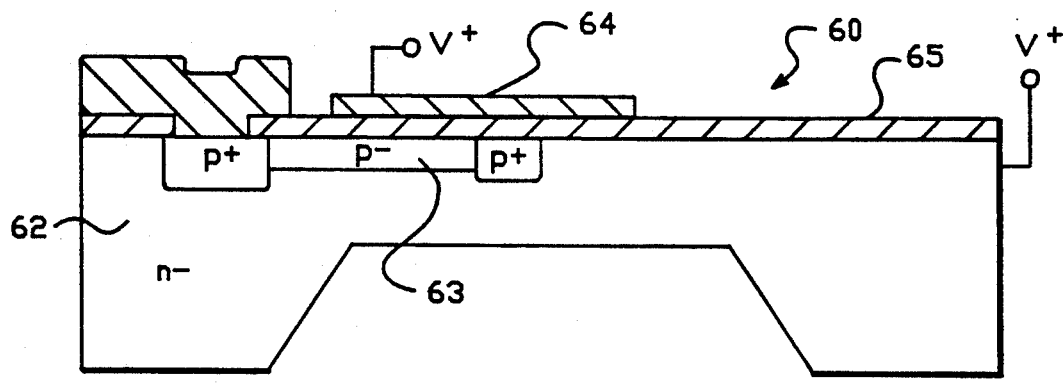
FIG.—3
(PRIOR ART)
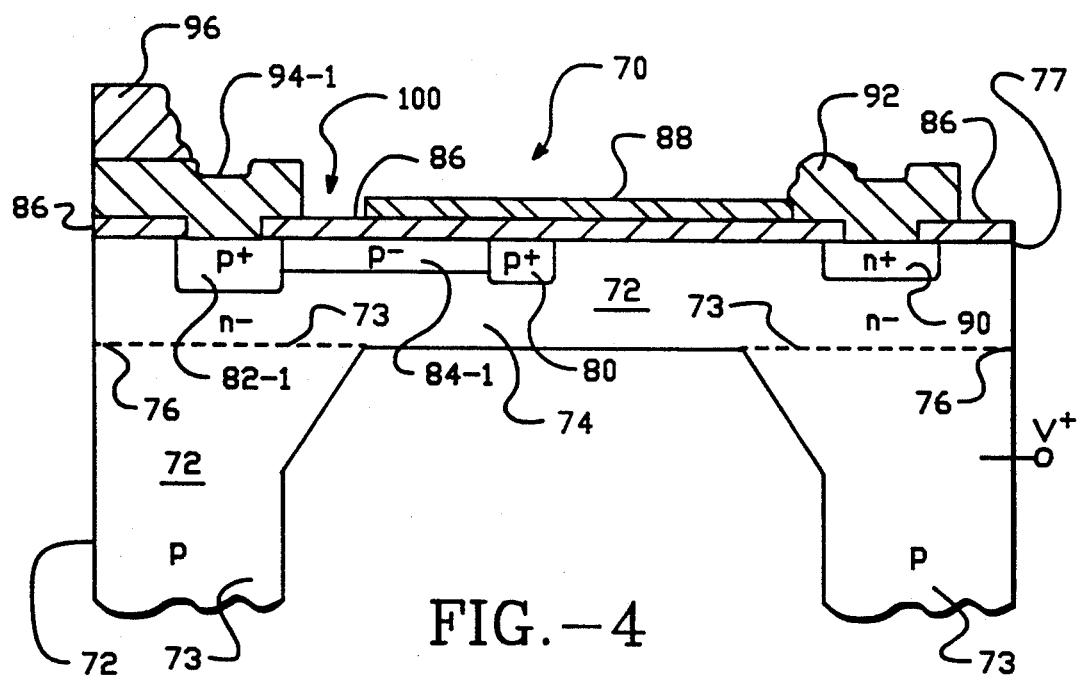
FIG.—4

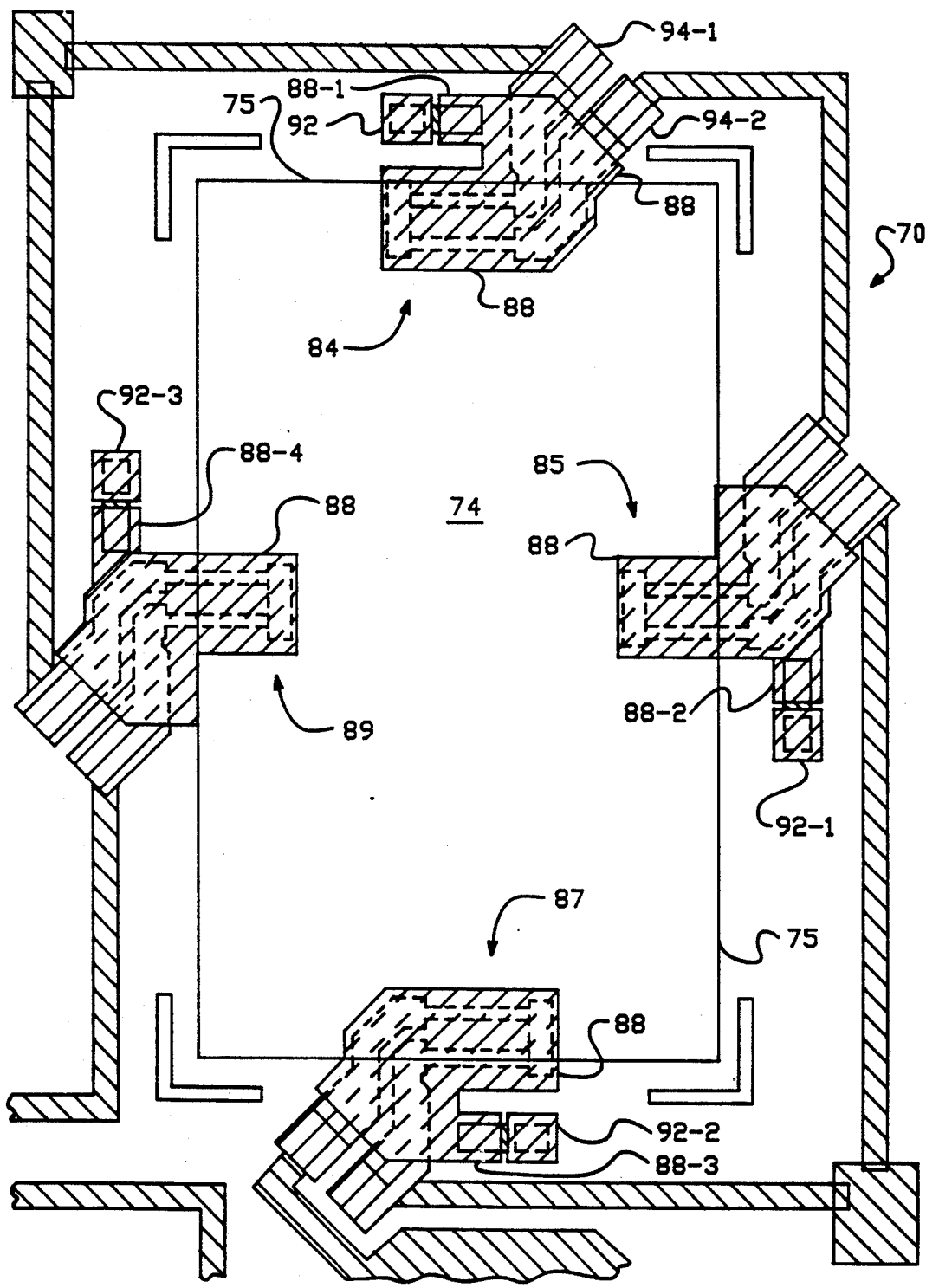
FIG.—5

SEMICONDUCTOR SENSOR WITH PIEZORESISTORS AND IMPROVED ELECTROSTATIC STRUCTURES

BACKGROUND OF THE INVENTION

1. Field of the Invention

The invention relates generally to sensors and, more particularly, to semiconductor electromechanical sensors which include piezoresistors.

2. Description of the Related Art

Semiconductor sensors with piezoresistors are well known. For example, one type of earlier pressure sensor includes a semiconductor wafer which defines a thinned diaphragm member surrounded by a thicker base portion. A piezoresistor formed on or adjacent to the diaphragm and connected in a Wheatstone-bridge circuit, for example, measures flexion of the diaphragm due to applied force. Piezoresistors typically have a resistance which varies with mechanical stress and temperature. As the diaphragm is deflected due to the application of a force, the resistivity of piezoresistors formed on or adjacent to the diaphragm changes. By measuring such changes in resistivity, a determination can be made as to the magnitude of the force applied to the diaphragm.

Other types of prior semiconductor sensors, such as an accelerometer, for example, may include a beam formed from a semiconductor material having a piezoresistor formed in it. The amount of flexure in the beam bears a known relationship to the magnitude of a force such as an acceleration force applied to the device. Flexure of the beam alters the stress applied to the piezoresistor formed in the beam which changes its resistance. By measuring the change in resistance, the amount of beam flexure can be measured. The beam flexure then can be used to determine the applied force.

Referring to the illustrative drawing of FIG. 1, there is shown a cross-sectional view of a typical earlier semiconductor pressure sensor 14 which comprises an n type wafer 16 which defines a thinned diaphragm 18 surrounded by a thicker base region 20. A surface 22 of the wafer 16 overlays both the base region 20 and the diaphragm 18. A p- doped piezoresistor 28 is formed in the diaphragm 18. A first p+ doped interconnect 26, formed in the base region 20, electrically connects one terminal of the piezoresistor 28 to a circuit contact 32, and a second p+ interconnect 24 formed in the diaphragm 18 also is electrically connected to the piezoresistor 28. The first p+ interconnect 26, for example, can be used to connect the piezoresistor 28 to other piezoresistors (not shown) of a Wheatstone-bridge circuit. An insulative layer 30 overlays the surface of the wafer 16. An opening is formed through the insulative layer so that the circuit contact 32 can be disposed in direct electrical contact with the first p+ interconnect 26.

One problem that can be experienced by pressure sensors such as that shown in FIG. 1 as well as sensors employing a beam having a piezoresistor formed therein, is the build up of electrostatic charges. For example, referring to FIG. 1, negative space charges 34 can build up in the wafer 16 in the vicinity of the piezoresistor 28. The amount of space charge 34 can change over time, and this change can cause "drift" in the resistance value of the piezoresistor. The build up of such space charges can be exacerbated by a corresponding build up of positively charged surface charges 36 on the surface of the insulative layer 30 opposite the negative space charge 34.

The illustrative drawing of FIG. 2 shows one possible solution to the space charge problem. A cross-sectional view of a semiconductor sensor 40 is shown in which a thin metal layer 42 overlays an insulative layer 44 on a portion of a diaphragm 45 that overlays piezoresistor 46. The metal layer 42 can be held at a predetermined constant positive potential (v+), for example, thus stabilizing the surface charge. A stabilized surface charge leads to improved stability in induced negative space charge and thus reduces drift.

Referring to the illustrative drawing of FIG. 3, there is shown still another possible solution to the space charge problem. A cross-sectional view of a semiconductor sensor 60 is shown in which both an n type wafer 62 and a metal layer 64 are connected to a positive (reverse bias) voltage source in order to reverse bias the p-n junction formed between the piezoresistor 63 and the wafer substrate and to maintain the wafer and the metal layer at the same voltage. The wafer 62 and the metal layer 64 are separated by an intervening insulative layer 65. Controlling the potential of the wafer, and the metal layer serves to stabilize the space charge surrounding the piezoresistor and thus reduce drift.

Unfortunately, there are certain disadvantages to the use of such a metal layer on a diaphragm surface. For example, a metal, such as aluminum, can suffer from mechanical hysteresis. This hysteresis, which can be induced both through mechanical flexing and/or thermal cycling, can cause change in the strain fields at the piezoresistor, even with no applied force. A change in the strain fields can result in a change in the offset (output) of a sensor employing a Wheatstone-bridge circuit, for example. In addition, the mechanical properties of the metal can permanently change due to flexion of the diaphragm. As a result, diaphragm flexibility can change through repeated flexing. Another problem is that the thermal coefficient of expansion of metals such as aluminum is not well matched to that of semiconductors like silicon. As a consequence, large offset changes may occur with changes in temperature, and the linearity of these offset changes with temperature may also be degraded. Furthermore, metals, particularly aluminum, can suffer from corrosion, which can degrade reliability. Thus, there has existed a need for an improved semiconductor sensor with piezoresistive elements and improved electrical and mechanical stability. The present invention meets this need.

SUMMARY OF THE INVENTION

In a present embodiment, the invention provides a semiconductor sensor which includes an n type semiconductor region which defines a flexible member surrounded by a more rigid base region. The semiconductor region has a surface that overlays both the flexible member and the base region. A piezoresistor is formed in the surface. An n+ region is formed in a portion of the surface which overlays the base region. An insulative layer overlays the piezoresistor and extends at least from the piezoresistor to the n+ region. A guard layer overlays at least a portion of the first insulative layer that overlays the piezoresistor. The guard layer is formed from a conductive material having a coefficient of thermal expansion close to that of the n type semiconductor layer. A bias contact disposed in the thicker base region electrically interconnects the n+ region and the guard layer. Thus, the sensor of the present invention provides a guard layer which can be used to control and stabilize electrostatic charge. The guard layer has improved mechanical hysteresis properties, is corrosion resistant, and has a thermal coefficient of expansion that is better matched to that of the semiconductor layer. These and other features and advantages of the present invention will become more apparent from the following description of an exemplary embodiment thereof, as illustrated in the accompanying drawings.

BRIEF DESCRIPTION OF THE DRAWINGS

The purpose and advantages of the invention will be apparent to those skilled in the art from the following detailed description in conjunction with the appended drawings in which:

FIG. 3 shows an illustrative cross-sectional view of a third earlier exemplary semiconductor sensor;

FIG. 4 shows an illustrative cross-sectional view of a semiconductor sensor in accordance with the present invention.

FIG. 5 shows a top elevation view of the sensor of FIG. 4; and

DETAILED DESCRIPTION OF THE PREFERRED EMBODIMENT

Figure 1:
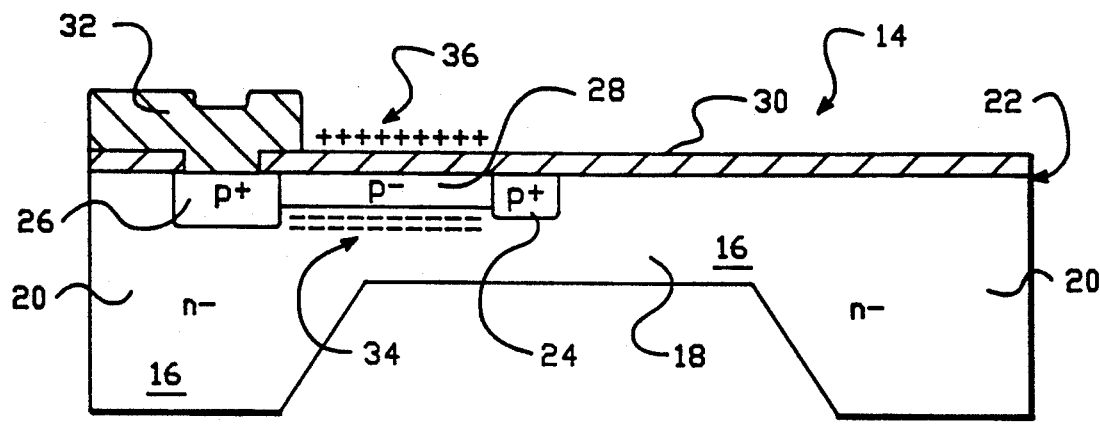
FIG. 1 shows an illustrative cross-sectional view of a first earlier exemplary semiconductor sensor.
Figure 2:
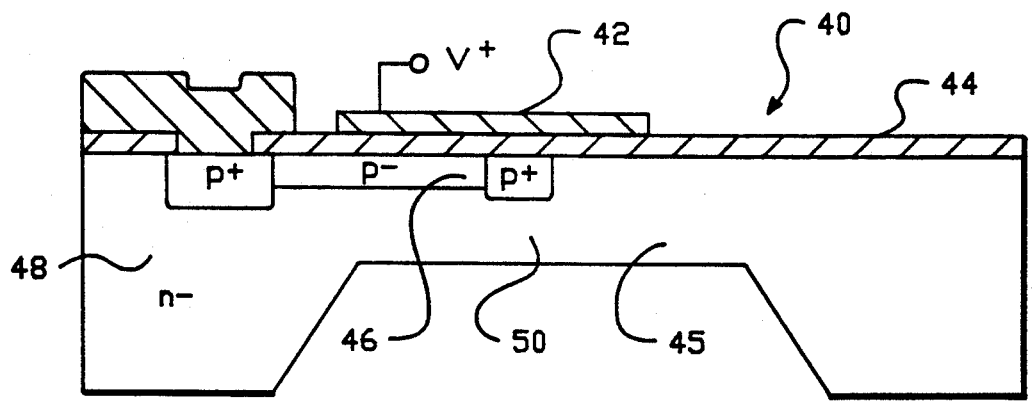
FIG. 2 shows an illustrative cross-sectional view of a second earlier exemplary semiconductor sensor.

The present invention comprises a novel semiconductor sensor and an associated method. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein. Referring to the illustrative drawings of FIG. 4, there is shown a cross-sectional view of a silicon electromechanical sensor 70 in accordance with a presently preferred embodiment of the invention. It will be understood that the view shown in FIG. 4 is merely for the purpose of illustration of the principles of the invention. The actual disposition of various components within the preferred embodiment is such that they cannot be readily shown together in a single cross-section. Consequently, the view shown in FIG. 4 is intended to be illustrative and conceptual in nature.

The sensor comprises an n-type epitaxial silicon region 72 formed on a p-type silicon wafer. The n-type region is shown above dashed line 73, and the p-type wafer is shown below dashed line 73. The n-type layer includes a thinned flexible diaphragm member 74 surrounded by a thicker more rigid base portion 76. In a present embodiment, the diaphragm is approximately ten microns thick. The epitaxial region 72 defines a planar surface 77 which overlays both the diaphragm member 74 and the base portion 76. A p- piezoresistor section 84-1 is formed in the diaphragm 74. In a present embodiment, the piezoresistor section 84-1 has a peak doping concentration of approximately 2E17 to 3E17 atoms per cubic centimeter and a sheet resistance of approximately 350–400 ohms/square.

A first low resistivity p+ interconnect region 82-1 is formed in the base portion 76, and a second low resistivity p+ interconnect region 80 is formed in the diaphragm member 74. The piezoresistor section 84-1 is interconnected to both the first and second p+ regions 82-1, 80. The first and second p+ regions have a sheet resistance of approximately 10 ohms/square. The resistivity of the n-type region is approximately 0.5-1.0 ohm-cm. The n type dopant is phosphorus. The p type dopant is boron.

A first insulative layer 86 overlays the entire surface 77, although it can be removed from portions of the diaphragm surface in certain cases. The first insulative layer may be silicon dioxide, silicon nitride or a combination of the two. Silicon oxinitride is a mixed state of the two compounds which might also be used. The first insulative layer 86 overlaying the diaphragm 74 is made thin to reduce thermal effects. An SiCr active guard layer 88 is disposed on top of the first insulative layer 86 so as to overlay the piezoresistor section 80-1 as explained more fully below. In a present embodiment, the SiCr layer is approximately 200 nm thick. The SiCr layer thickness, however, can be within a range of approximately 20 to 500 nm for best results, although devices with SiCr layer thickness outside that range are possible. The term "active" refers to the fact that the potential of the guard layer is externally controlled (held at a substantially fixed voltage).

An n+ region 90 is formed in the more rigid base portion as shown. The doping concentration of the n+ region 90 is at least approximately 5E19 atoms per cubic centimeter. A first bias contact 92 deposited in the base region makes direct electrical contact with the underlying n+ layer through an opening in the first insulative layer 86. The bias contact 92 also makes a direct electrical connection to the SiCr guard layer 88. In the present embodiment, the bias contact is aluminum, but alternative materials such as gold, polysilicon, other metals, for example, could be used without departing from the invention.

Additionally, a circuit contact 94-1 deposited in the base region makes direct electrical connection with the first p+ region 82-1 through another opening in the first insulative layer 86. It will be noted that a space indicated as 100 is maintained between the SiCr layer 88 and the circuit contact 94-1 so that the SiCr layer 88 does not make a direct electrical connection with the external contact 94-1. The distance between the p+ region/circuit contact and the guard is set by design rules and process constraints, but generally should be kept at a minimum. It is desirable that no electrical leakage occurs between the p+ region/circuit contact and the guard. Typically, the distance is on the order of about 5 microns. A second thicker insulative layer 96 overlays the base region 76. In a present embodiment, the second insulative layer is deposited silicon oxide. This second layer does not overlay any portion of the diaphragm or the guard layer, as its thickness could result in undesirable thermal properties.

In the embodiment of FIG. 4, the sensor structure is formed in an n-type epitaxial layer 72 shown above dashed line 73 formed in a p-type wafer shown below dashed line 73. Alternatively, the sensor structure can be formed in an n-type wafer as the starting material. Moreover, in a present embodiment the surface 77 is planar. However a contoured surface could be employed instead.

Referring to the illustrative drawings of FIG. 5, there is shown a simplified top elevation view of the sensor 70 in which the spatial relationship of the diaphragm member 74, within lines 75, to the base portion 76 is depicted. Four piezoresistors 84, 85, 87 and 89 are shown connected in a Wheatstone-bridge-type circuit which is well know to those skilled in the art which need not be described herein. The first and second insulative layers are not shown so as to simplify the illustration. Four separate guard layer regions, all labelled 88, overlay four different piezoresistors disposed beneath the separate guard layers. Four respective guard layer portions 88-1, 88-2, 88-3 and 88-4 also overlay respective areas of the epitaxial region between the respective piezoresistors and the respective bias contacts 92, 92-1, 92-1 and 92-3. The four separate SiCr guard layers are spaced apart so as to not be continuous with each other. Thus, the guard layer does not cover other portions of the diaphragm so that any small thermal mismatch or hysteresis effects are kept to a minimum.

Figure 6:
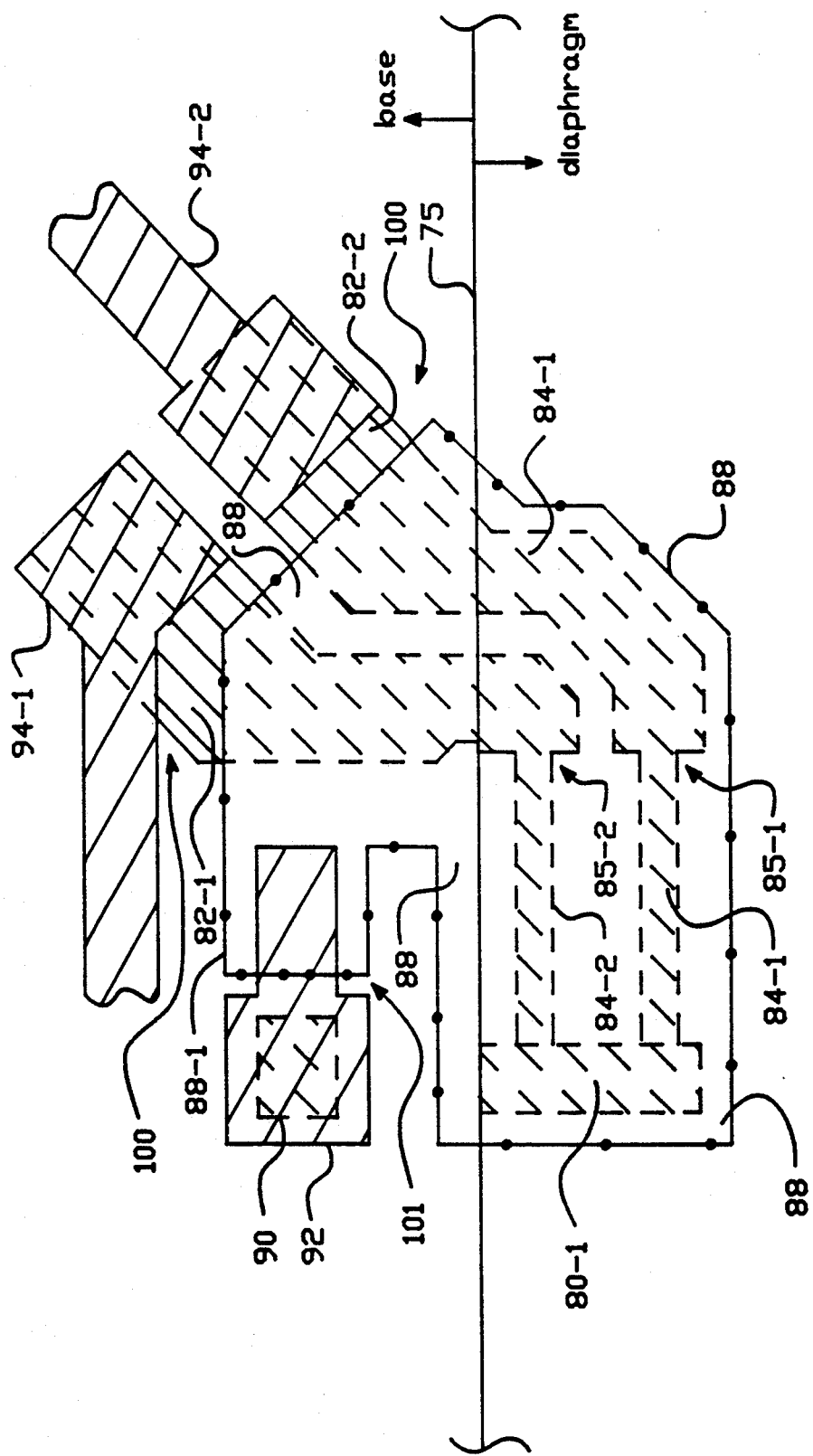
FIG. 6 shows a top elevation view of a portion of the sensor of FIG. 4.

Referring to the illustrative drawing of FIG. 6, there is shown a top plan view of one of the piezoresistors 84 of FIG. 5. The piezoresistor 84 includes sections 84-1, 84-2. The line 75 indicates the boundary between the flexible diaphragm 74 and the more rigid base portion 76.

It will be noted that the piezoresistor sections 84-1, 84-2 are disposed near the edge of the diaphragm. Alternatively, they could be disposed in the base portion adjacent to the diaphragm. A piezoresistor typically is placed in the region of highest stress concentration during diaphragm flexure. This highest stress region may be off the edge of the diaphragm if the diaphragm is relatively thick.

The drawings of FIG. 6 show the two piezoresistor sections 84-1, 84-2 of only one piezoresistor 84. It will be appreciated from the drawings of FIG. 5, however, that in the actual sensor of a present embodiment, four such piezoresistors 84, 85, 87 and 89 are connected in a Wheatstone-bridge circuit. Furthermore, in FIG. 6, certain components overlay other components. Components which are overlain by other components are illustrated using dashed lines. For simplicity's sake, the first and second insulative layers 86 and 96 are not shown in FIG. 6.

The piezoresistor 84 includes two elongated narrow parallel sections labelled as 84-1 and 84-2. The respective sections 84-1 and 84-2 define respective first and second end portions 85-1, 85-2. The use of two such parallel sections more efficiently picks up stress during operation. The width of the resistor sections is determined by the total width that can be controllably patterned (typically approximately 5 microns). In a present embodiment, the sheet resistance of the piezoresistor sections 84-1, 84-2 is about 350–400 ohms/square, and the total bridge resistance of the Wheatstone-bridge circuit is approximately 5000 ohms. The p+ region 80-1 electrically interconnects respective first ends of the two piezoresistor sections 84-1, 84-2. The p+ regions 82-1 and 82-2 electrically interconnect respective second ends of the two piezoresistor sections to respective circuit contacts 94-1 and 94-2. The circuits contacts 94-1, 94-2 interconnect the piezoresistor sections 84-1, 84-2 to the Wheatstone-bridge circuit 91 shown in FIG. 5.

The SiCr guard layer 88 (indicated in outline by "beaded" lines) overlays the piezoresistor sections 84-1, 84-2 as well as the first p+ regions 82-1, 82-2 and the second p+ region 80. The guard layer 88 does not electrically contact either of the circuit contacts 94-1 or 94-2. As shown in FIG. 5, the other three piezoresistors 85, 87 and 89 are similarly overlain by the guard layer 88.

The first bias contact 92 is formed in the thicker base portion of the n-type region 76. The bias contact 92 overlays and makes direct electrical contact with the portion of the active guard layer labelled 88-1. The first n+ region 90 (shown with dashed lines) is disposed beneath and in direct electrical connection with the first bias contact 92 as explained above with reference to FIG. 4.

A lateral space indicated by arrow 101 is maintained between the guard layer 88 and the opening to the first n+ region 90. The guard layer 88 does not physically contact the n+ region due to processing steps. The opening through the first insulative layer 86 is formed after the guard layer is formed. Moreover, the guard layer is thin, and there could be step coverage problems if the guard layer was made to directly contact the n+ layer. Furthermore, an alloyed aluminum contact has a lower resistance and often is more reproducible than would be a direct contact between silicon and the guard layer. The SiCr layer 88 thus is electrically connected to the n+ layer by the bias contact 92.

Referring once again to FIG. 4, it will be noted that the epitaxial layer of the wafer 72 is connected to a positive reverse bias voltage which stabilizes electrostatic charge build-up. More particularly, another contact (not shown) electrically connected to another n+ region (not shown) formed in the n-type region electrically connects the wafer substrate to a more positive voltage such as the most positive point on the Wheatstone-bridge circuit, for example.

In general, the charge distribution within a semiconductor wafer is directly related to the potential distribution within it. This potential distribution can be controlled by controlling the potential of the surfaces of the region. If these potentials are held substantially fixed and stable, the charges within the material should also be stable. The bias potential to be maintained should be at least as high as the most positive point on the bridge, so that the reverse bias condition of the piezoresistors can be maintained (typically 5 volts). The bias potential should not, however, exceed the reverse bias breakdown voltage of the piezoresistors 84, 85, 87 and 89, which may be as low as 13-15 volts.

The n+ region 90 serves to electrically connect the substrate and the first bias contact 92. The SiCr guard layer 88 is electrically interconnected with the substrate via the bias contact 92 and the n+ region. Since SiCr is electrically conductive, the build up of both electrostatic surface charge and space charge can be stabilized by holding both the wafer 72 and the SiCr layer at a positive bias potential. The use of an SiCr active guard layer has several advantages. For example, the thermal coefficient of expansion (TCE) of SiCr is well matched to that of Silicon. A material with a TCE less than 15 ppm per ° C is well matched to silicon for the purposes herein.

The following chart shows representative TCEs of selected materials:

| MATERIAL | TCE (ppm/°C.) |
| --- | --- |
| Aluminum | 23.2 |
| Copper | 16.8 |
| Germanium | 5.7 |
| Gold | 14.1 |
| Indium | 31.9 |
| Lead | 28.9 |
| Molybdenum | 5.0 |
| Nickel | 12.7 |
| Platinum | 8.9 |
| Silicon/Polysilicon | 2.5 |
| Silicon Carbide | 3.3 |
| SiCr | 4.0 (est) |
| Silver | 19.2 |
| Tantalum | 6.5 |
| Tin | 21.2 |
| Titanium Carbide | 6.4 |
| Tungsten | 4.5 |

Additionally, SiCr is corrosion resistant. SiCr does not suffer the same degree of mechanical hysteresis as metal. In a presently preferred embodiment, no metal, is disposed on the planar surface 77 over any of the piezoresistors 84, 85, 87 and 89. Consequently, the disadvantages of mechanical hysteresis and poorly matched TCE are substantially avoided. Moreover, the metal contacts on the thicker base region can be protected somewhat from corrosion by the overlaying second insulative layer.

Alternatively, a material such as molybdenum could be used as the active guard layer. Molybdenum has more favorable mechanical properties than aluminum, for example. Moreover, the guard layer could be polysilicon doped to obtain a sheet resistance below approximately one Megaohm/square. Other possible guard layer materials include NiCr (nickel-chrome), tantalum nitride, tungsten nitride, and titanium-tungsten-nitride. Moreover, for example, materials such as silicon, titanium, chromium, nickel and conducting oxides, nitrides and alloys of these are acceptable. In general, for example, refractory metals and conducting compounds of such refractory metals, such as nitrides and silicides, are acceptable.

Thus, various modifications to the preferred embodiment can be made without departing from the scope of the invention. For example, the principles of the invention can be applied to piezoresistors in a flexible beam member of a sensor used as an accelerometer. Thus, the foregoing description is not intended to limit the invention which is described in the appended claims in which:

What is claimed is:

1. An electromechanical sensor comprising:
   an n type semiconductor region which defines a thin flexible member adjacent to a thicker more rigid base portion;
   at least one piezoresistor;
   at least one n+ region formed in the base portion;
   a first insulative layer which overlays said piezoresistor and which extends between said piezoresistor and said first n+ doped region;
   a guard layer formed from an electrically conductive material having a coefficient of thermal expansion in the range of approximately (0 to 15 ppm/° C) and which is disposed over at least a portion of said first insulative layer so as to overlay said at least one piezoresistor; and
   a bias contact disposed in the base portion which electrically interconnects said n+ region and said guard layer.

2. The sensor of claim 1 wherein said guard layer is formed from SiCr.

3. The sensor of claim 1 wherein said guard layer is formed from polysilicon.

4. The sensor of claim 1 wherein said guard layer is formed from molybdenum.

5. The sensor of claim 1 wherein said guard layer is formed from a material selected from the group consisting of silicon, titanium, chromium, nickel and conducting oxides, nitrides and alloys of such materials.

6. The sensor of claim 1 wherein said at least one piezoresistor is formed in the flexible member.

7. The sensor of claim 1 wherein said at least one piezoresistor includes a first end portion and a second end portion and further including:
   at least two circuit contacts disposed in the base portion; and
   at least two first electrical interconnections formed in the semiconductor region, one of said first interconnections interconnecting said first end portion and one of said circuit contacts, another of said first interconnections interconnecting said second end portion and another of said circuit contacts;
   wherein said guard region overlays said at least two first interconnections.

8. The sensor of claim 1 wherein said at least one piezoresistor includes at least two elongated sections aligned in parallel and further including:
   at least two circuit contacts disposed in the base portion; and
   at least two first electrical interconnections formed in the semiconductor region, one of said first interconnections electrically interconnecting one of said circuit contacts and one of said sections, another of said first interconnections electrically interconnecting another of said circuit contacts and another of said sections; and
   a second electrical interconnection formed in the semiconductor region, said second interconnection electrically interconnecting said at least two elongated sections;
   wherein said guard region overlays said at least two first interconnections and said second interconnection.

9. The sensor of claim 7 or 8 wherein said guard layer does not make electrical contact with either of said at least two circuit contacts.

10. The sensor of claim 1 wherein said at least one piezoresistor includes at least two elongated sections aligned in parallel and further including:
   at least two circuit contacts disposed in the base portion; and
   at least two first electrical interconnections formed in the semiconductor region, one of said interconnections electrically interconnecting one of said circuit and contacts and one of said sections, another of said interconnections electrically interconnecting another of said circuit contacts and another of said sections; and
   at least one second electrical interconnection formed in the semiconductor region, said second interconnection electrically interconnecting said at least two elongated sections;

wherein said guard region overlays said at least two first interconnections and said at least one second interconnection; and wherein said piezoresistor is disposed substantially in said flexible member; and wherein said guard layer overlays only potions of the flexible member occupied by said at least two elongated sections and said at least two interconnections and said at least one second interconnection.

11. The sensor of claim 1 wherein said first insulative layer overlays substantially the entire flexible member.

12. The sensor of claim 1 wherein said first insulative layer overlays substantially the entire semiconductor region.

13. The sensor of claim 1 and further including a second insulative layer which overlays the base portion.

14. The sensor of claim 1 wherein said flexible portion includes a diaphragm surrounded by said base portion.

15. An electromechanical sensor comprising:
an n-type silicon region which defines a flexible member adjacent to a more rigid base portion;
at least one piezoresistor formed in the silicon region;
at least one first n+ region formed in the base portion;
at least one circuit contact disposed in the base portion; and
at least one first electrical interconnection interconnecting said at least one circuit contact and said at least one piezoresistor;
a first insulative layer which overlays said at least one piezoresistor and said at least one first interconnection and which extends between said at least one piezoresistor and said first n+ region; and
an SiCr layer which overlays at least a portion of said first insulative layer such that said SiCr layer overlays said at least one piezoresistor and overlays said at least one first interconnection, said SiCr layer also extending between said piezoresistor and a point adjacent to said first n+ doped region; and
a bias contact disposed in the base portion and which electrically interconnects said n+ region and said SiCr layer.

16. The sensor of claim 15, wherein said SiCr layer overlays substantially only areas of the flexible member occupied by said at least one piezoresistor and by said at least one first interconnection and between said at least one piezoresistor and said at least one n+ region.

17. The sensor of claim 15 wherein said first insulative layer overlays substantially the entire flexible member.

18. The sensor of claim 17 and further including a second insulative layer which overlays substantially only the base portion such that said first insulative layer is interposed between said first insulative layer and the n-type silicon region.

19. An electromechanical sensor comprising:
an n-type silicon region which defines a thin flexible member adjacent to a thicker more rigid base portion;
a Wheatstone bridge circuit formed in the silicon region and including at least four circuit elements, each circuit element including,
a respective piezoresistor,
a respective n+ region formed in the base portion,
a respective guard layer formed from an electrically conductive material having a coefficient of thermal expansion in the range of approximately (0 to 15 ppm/° C), and
a respective bias contact which electrically interconnects the respective n+ region and the respective guard layer; and
a first insulative layer disposed between the respective guard layers and the respective piezoresistors;
wherein said respective guard layers are spaced apart from each other.

20. The sensor of claim 19 wherein said respective guard layers are formed from SiCr.

21. The sensor of claim 19 wherein said respective guard layers are formed from polysilicon.

22. The sensor of claim 19 wherein said respective guard layers are formed from molybdenum.

23. The sensor of claim 19 wherein said respective guard layers are formed from a material selected from the group consisting of silicon, titanium, chromium, nickel and conducting oxides, nitrides and alloys of such materials.

* * * * *